(12) United States Patent
Goodwin et al.

(10) Patent No.: US 7,209,906 B2
(45) Date of Patent: Apr. 24, 2007

(54) SYSTEM AND METHOD FOR IMPLEMENTING A METRICS ENGINE FOR TRACKING RELATIONSHIPS OVER TIME

(75) Inventors: James Patrick Goodwin, Beverly, MA (US); Carl Joseph Kraenzel, Boston, MA (US); Andrew Lewis Schirmer, Andover, MA (US); David LeRoy Newbold, West Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 10/044,914

(22) Filed: Jan. 15, 2002

(65) Prior Publication Data
US 2003/0135606 A1     Jul. 17, 2003

Related U.S. Application Data

(60) Provisional application No. 60/347,283, filed on Jan. 14, 2002.

(51) Int. Cl.
*G06F 15/18* (2006.01)

(52) U.S. Cl. .............................. 706/14; 706/12; 706/46
(58) Field of Classification Search .................. 706/14, 706/12, 46; 705/8
See application file for complete search history.

(56) References Cited

U.S. PATENT DOCUMENTS

| 4,744,028 A | * | 5/1988 | Karmarkar ...................... 705/8 |
| 5,761,512 A | | 6/1998 | Breslau et al. ............... 395/705 |
| 5,895,470 A | | 4/1999 | Pirolli et al. ................. 707/102 |
| 6,041,311 A | | 3/2000 | Chislenko et al. ............. 705/27 |
| 6,078,918 A | | 6/2000 | Allen et al. ...................... 707/6 |
| 6,115,709 A | | 9/2000 | Gilmour et al. ................ 707/9 |
| 6,144,944 A | | 11/2000 | Kurtzman, II et al. ........ 705/14 |
| 6,208,994 B1 | | 3/2001 | Abdelnur ..................... 707/103 |
| 6,226,648 B1 | | 5/2001 | Appleman et al. .......... 707/102 |
| 6,240,466 B1 | | 5/2001 | McKeehan et al. ......... 709/316 |
| 6,269,369 B1 | | 7/2001 | Robertson ..................... 707/10 |
| 6,349,295 B1 | | 2/2002 | Tedesco et al. ................ 707/3 |

(Continued)

FOREIGN PATENT DOCUMENTS

EP       1 087 306        3/2001

(Continued)

OTHER PUBLICATIONS

Maybury et al., "Expert Finding for Collaborative Virtual Environments", *Communications of the ACM*, vol 44, No. 12, Dec. 2001, pp. 1, 2, 55, 56.

(Continued)

*Primary Examiner*—Joseph P. Hirl
(74) *Attorney, Agent, or Firm*—Pillsbury Winthrop Shaw Pittman LLP (57) ABSTRACT

The present invention enables a flexible system for representing relationships among computing resources, assigning them strengths, and versioning them over time. One advantage is that all of the various ways that these entities are named in the real world can be normalized into a common model of identifiers (IDs) and types such that universal manipulations by class are possible without losing the capability to present the resulting information back with the original entity names or even with multiple equivalent names.

25 Claims, 2 Drawing Sheets

U.S. PATENT DOCUMENTS

| | | | |
|---|---|---|---|
| 6,353,840 B2 | 3/2002 | Saito et al. | 707/517 |
| 6,377,949 B1 | 4/2002 | Gilmour | 707/10 |
| 6,377,983 B1 | 4/2002 | Cohen et al. | 709/217 |
| 6,397,203 B1 | 5/2002 | Hembry | 707/2 |
| 6,421,669 B1 | 7/2002 | Gilmour et al. | 707/9 |
| 6,513,039 B1 | 1/2003 | Kraenzel | 707/9 |
| 6,516,350 B1 * | 2/2003 | Lumelsky et al. | 709/226 |
| 6,523,026 B1 | 2/2003 | Gillis | 707/3 |
| 6,560,588 B1 | 5/2003 | Minter | 706/50 |
| 6,626,957 B1 | 9/2003 | Lippert et al. | 715/513 |
| 6,640,229 B1 | 10/2003 | Gilmour et al. | 707/9 |
| 6,647,384 B2 | 11/2003 | Gilmour | 707/5 |
| 6,668,251 B1 | 12/2003 | Goldberg | 707/5 |
| 6,687,873 B1 | 2/2004 | Ballantyne et al. | 715/500 |
| 6,697,800 B1 | 2/2004 | Jannink et al. | 707/5 |
| 6,711,570 B1 | 3/2004 | Goldberg et al. | 707/6 |
| 6,714,936 B1 * | 3/2004 | Nevin, III | 707/102 |
| 6,732,331 B1 | 5/2004 | Alexander | 715/513 |
| 6,754,648 B1 | 6/2004 | Fittges et al. | 707/1 |
| 6,789,054 B1 * | 9/2004 | Makhlouf | 703/6 |
| 6,801,940 B1 * | 10/2004 | Moran et al. | 709/224 |
| 6,832,224 B2 | 12/2004 | Gilmour | 707/100 |
| 6,836,797 B2 * | 12/2004 | Givoly et al. | 709/223 |
| 7,043,698 B2 | 5/2006 | Newbold | 715/789 |
| 2002/0049621 A1 * | 4/2002 | Bruce | 705/7 |
| 2002/0087600 A1 | 7/2002 | Newbold | 707/514 |
| 2002/0107861 A1 | 8/2002 | Clendinning et al | 707/101 |
| 2002/0111934 A1 | 8/2002 | Narayan | 707/1 |
| 2002/0152244 A1 | 10/2002 | Dean et al. | 707/530 |
| 2003/0105732 A1 | 6/2003 | Kagalwala et al. | 707/1 |
| 2004/0068477 A1 | 4/2004 | Gilmour et al. | 707/1 |
| 2004/0111386 A1 * | 6/2004 | Goldberg et al. | 707/1 |
| 2004/0205548 A1 | 10/2004 | Bax et al. | 715/513 |

FOREIGN PATENT DOCUMENTS

| | | |
|---|---|---|
| EP | 1 143 356 | 10/2001 |

OTHER PUBLICATIONS

Mattox et al., "Enterprise Expert and Knowledge Discovery", *Proceedings of the International Conference on Human Computer Interaction Conference*, Aug. 23-27, 1999, Munich, Germany, 11 pages.

"Automated Expertise Profiling Saves Time", http://www.tacit.com/products/profiling.htmt, printed Jan. 9, 2002, 3 pages.

"KnowledgeMail", http://www.tacit.com/products/knowledgemail.html, printed Jan. 9, 2002, 3 pages.

"Expertise Discovery & Search", http://www.tacit.com/products/espdiscovery.html, printed Jan 9, 2002, 2 pages.

Vivacqua, Adriana, et al., "Agents to Assist in Finding Help", *Conference on Human Factors & Computing Systems Proceedings*, in the Hague, the Netherlands, Apr. 2000, pp. 65-72.

Tacit, KnowledgeMail & KnowledgeMail Plus, "Creating the Smarter Enterprise" (Tacit Knowledge Systems, Inc., © May 2001).

http://www.forbes.com/global/2001/0205/088_print.html, as it appears on Feb. 26, 2001.

McDonald, David W., "Evaluating Expertise Recommendations", *Proceedings of the 2001 International ACM SIGGROUP Conference on Supporting Group Work*, in Boulder, Colorado, Oct. 2, 2001, pp. 214-223.

http://www.tacit.com. as it appears on Dec. 7, 2000.

Wang, Jidong, et al., "Ranking User's Relevance to a Topic Through Link Analysis on Web Logs", *Proceedings of the $4^{th}$ Intenational Workshop on Web Information and Data Management* in McLean, Virginia, ACM Press, Nov. 8, 2002, pp. 49-54.

* cited by examiner

SYSTEM AND METHOD FOR IMPLEMENTING A METRICS ENGINE FOR TRACKING RELATIONSHIPS OVER TIME

CROSS-REFERENCE TO RELATED APPLICATIONS

This patent application claims priority to U.S. Provisional Patent Application No. 60/347,283 filed Jan. 14, 2002, titled "KNOWLEDGE SERVER" in the name of James Patrick GOODWIN et al., which is hereby incorporated by reference in its entirety.

FIELD OF THE INVENTION

The present invention relates generally to a system and method for using metrics to determine, and track over time, relationships and affinities in a knowledge management system.

BACKGROUND OF THE INVENTION

Companies, educators, government agencies and other organizations frequently want to track statistics about usage of computing resources. Some of these computing resources are physical entities (e.g., people, computers, etc.), some are logical entities (e.g., categories, documents, e-mail conversations, etc.) and some are synthetic computed relationship derived by summarizing other relationships as a class and computing a relationship.

In many existing systems it is difficult to determine relationships and affinities between such diverse data sources, therefore, the resources are often not exploited. In addition, it can be costly and time consuming to analyze the amount of data generated in a knowledge management system.

Another drawback of existing systems is that they do not provide for evolution of determined relationships and affinities over time. Once a relationship or affinity is reported, there often exists no way to ensure that the relationship has not changed or become stale. Other drawbacks also exist.

SUMMARY OF THE INVENTION

The present invention enables a flexible system for representing relationships among computing resources, assigning them strengths, and versioning them over time. One advantage is that all of the various ways that these entities are named in the real world can be normalized into a common model of identifiers (IDs) and types such that universal manipulations by class are possible without losing the capability to present the resulting information back with the original entity names or even with multiple equivalent names.

The invention enables the use of metrics to facilitate uncovering some of the relationships between data. As discussed herein, metrics may be used to learn about different knowledge sources and their activity within an organization. Metrics are a system that may evaluate documents, people, categories of information, and the relationships between them so that an organization may identify and make better use of its knowledge sources.

The Metrics system gathers usage statistics for acquired data and calculates relative data values based on these statistics. Both the statistics and the calculated values are known as metric values. A knowledge discovery server uses metric values to rank the data it processes. For example, when users browse categories with a knowledge map, documents that have the highest values may appear first by default in each category so that they are easier to access. Once enabled, the Metrics system keeps the server current by continuously updating metric values for existing data and calculating value for newly acquired (e.g., spidered) data.

According to some embodiments, one of the values the Metrics system calculates is document value. Each document's value may be calculated based on the one or more of the following: the number of links a document contains, and the number of links that have been created to the document from other documents, the number of times a document has been opened with a knowledge map, the number of times the document has been responded to, and the number of times the document has been edited. When calculating document value, Metrics may assign different weight to each of these raw metrics using the order of the document constants on a Metrics Settings form.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

The present invention can be described with reference to its operation within a knowledge management system. While any suitable knowledge management system may exploit the advantages of the present invention, and the invention is not limited to a particular knowledge management system, several embodiments are sometimes described herein with reference to the Lotus Discovery Server environment. Several relevant terms are defined herein as follows.

Knowledge management is defined as a discipline to systematically leverage information and expertise to improve organizational responsiveness, innovation, competency, and efficiency.

The Discovery Server 102 (e.g., Lotus Discovery Server) is a knowledge system which may be deployed across one or more servers. At its core, the Discovery Server 102 integrates code from several sources (e.g., Domino, DB2, InXight, KeyView and Sametime). The Discovery Server 102 collects, analyzes and identifies relationships between documents, people, and topics across an organization. The Discovery Sever may store this information in a data store (e.g., a DB2 data store) and may present the information for browse/query through a Web interface which is referred to as the knowledge map (e.g., K-map). The Discovery Server 102 regularly updates the knowledge map by tracking data content, user expertise, and user activity. The Discovery Server 102 may gather information from various sources (e.g., Lotus Notes databases, Web sites, file systems, etc.) using spiders (defined below).

A knowledge map editor interface may provide access to the knowledge map. Internally, the Discovery Server 102 may maintain and update the knowledge map through components called Discovery Services (defined below). In some embodiments, the knowledge map editor may be used as an administration tool by a set of designated editors.

As discussed above, the knowledge map is a map of the relationships between organizational resources. Physically, the knowledge map may exist in any suitable data store that contains content from many disparate data sources, and value-added data derived from that content (e.g., a DB2 data store). The knowledge map content hierarchy is often referred to as a taxonomy.

A taxonomy is a generic term used to describe a classification scheme, or a way to organize and present information. The knowledge map is a taxonomy. The knowledge map is a hierarchical representation of content organized by a suitable builder process (e.g., the K-map Builder process).

An example of a taxonomy can be found at most major Internet search sites where information has been categorized into a few high-level categories. Each top-level category contains other subcategories, and each subcategory can be further divided into other subcategories, and so on. For example, if a user selected Finance as a top-level category, he might be presented with a list of subcategories related to finance from which to further select, or refine, his search.

The knowledge map editor is defined here as the software interface that may be provided as part of the Discovery Server. Editors (e.g., people) may use this interface to access and modify the organization of knowledge map content and category fields to meet the needs of the organization.

The Discovery Server Control Center may comprise a Web browser-based user interface which administrators (e.g., people) use to configure and maintain the Discovery Server. Administrators may use a Startup view to get started during initial implementation, and a Maintenance view to perform ongoing tasks, such as reallocating services and spidering new data repositories.

Discovery Services may comprise Discovery Server 102 components that capture, analyze, process, calculate, build, and maintain information in the knowledge map. For example, the following is a list of some Lotus Discovery Server Discovery Services: Spiders, Profile Source, Profile Synchronizer, Metrics Collector, Metrics Processor, K-map Builder, K-map Indexer.

A spider is a process used by Discovery Server 102 to extract information from data repositories. While the invention is not limited to a particular type of spider, in some embodiments three types of spiders exist to support the following data types: Notes spiders (includes, e.g., QuickPlace, Domino.Doc), File system spiders (Windows or Windows-compatible (e.g., NTFS, FAT, FAT32), and also any other file system that Windows can see, such as a mapped Novell or UNIX share) and Web spiders. Of course, other spiders may be used for other data types. "Spidering" is the act of extracting data from these data types and converting the output into a markup format (e.g., XML) for further processing by Discovery Services.

A data repository is defined as any source of information that can be spidered by a Discovery Server. While the invention is not limited to particular types of data, in some embodiments the following data types are supported: Notes databases, QuickPlace, Domino.Doc, Windows or Windows-compatible file systems (e.g. NTFS, FAT, FAT32, and also any other file system that Windows can see, such as a mapped Novell or UNIX share), and Web data (HTTP).

A training set is a special subset of data repositories which are used to build the first draft of a knowledge map. In some embodiments, these data repositories contain information which is inherently representative of the type of data the organization would like to see exposed in the taxonomy.

Affinities are calculated by the Discovery Server 102 metrics processes, which collect and calculate data about user interactions with all documents clustered within a knowledge map category. For example, if a user has authored, read, edited, responded to, or created links to a number of documents in a category, then the metrics component calculates the strength of those interactions relative to others in the organization and proposes an affinity to the user. Approved or published affinities may be stored in a user's profile. Therefore, an affinity is a relationship between a person and a category that already exists within the knowledge map; they do not show expertise, but simply an interest in, or relationship to, the topic covered in that category.

User profiles are initially extracted from an authoritative people source (e.g., Domino Directory from a Domino server, or an LDAP server such as IBM Secureway Directory, iPlanet or Active Directory), and then loaded into a separate database (e.g., Lotus Notes database (people.nsf)) on a Discovery Server. Each person that the Discovery Server 102 knows about has a separate profile that is created and automatically maintained. Users can query this database directly to locate experts by skill, experience, project, education, and job type.

Document valuation is basically tracking the value of content within an organization. For example, to track the value of content the following evaluations may be made: has the content been edited or responded to, have links (e.g., doclinks) been created by users to particular documents (which would indicate a higher value of that content than other documents), do users alter their documents, do users create category links to documents, do users respond to documents in a discussion database, do users delete documents, and other evaluations. All these evaluations add up to defining which documents the people within an organization value the most. As described herein, a Discovery Server 102 metrics service does the accounting and the filing of document valuation.

Figure 1:
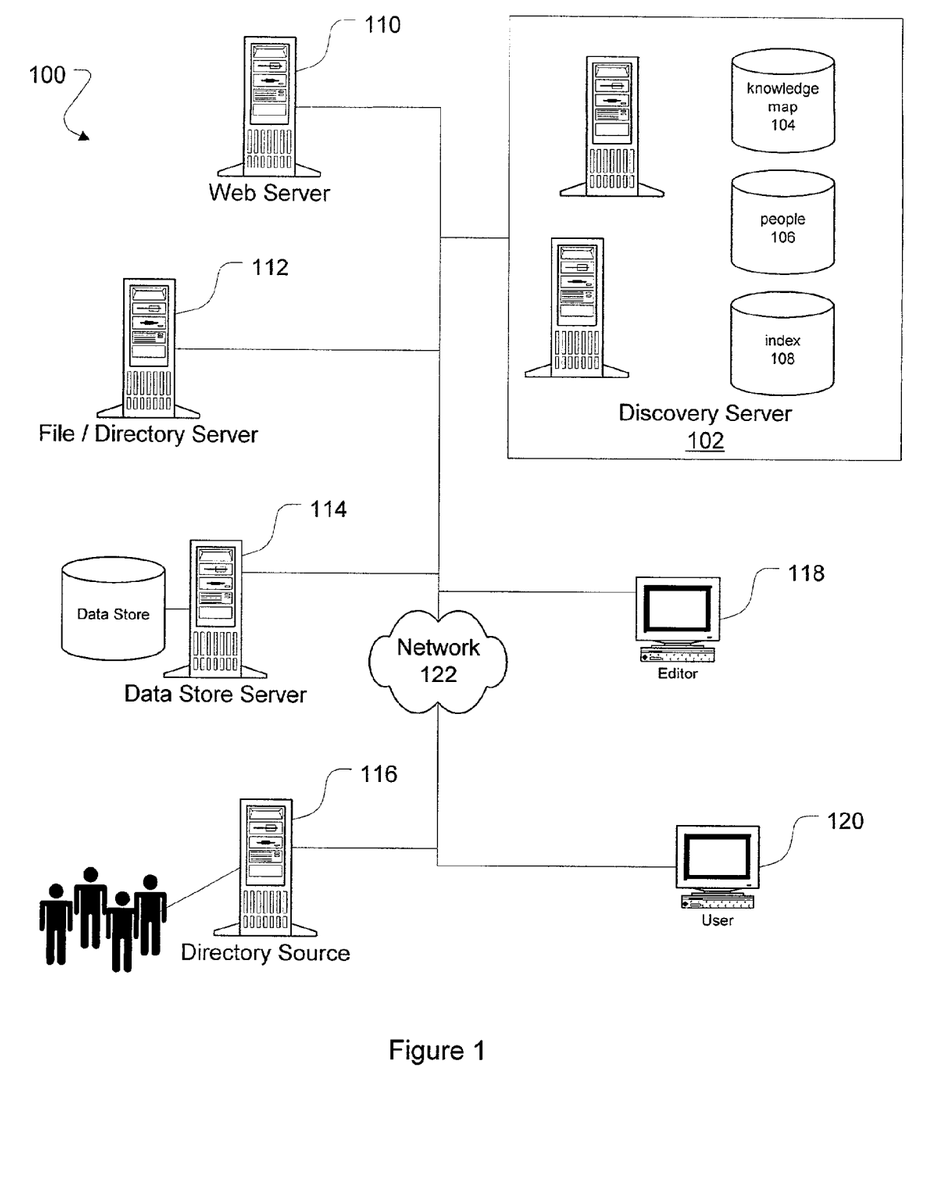
FIG. 1 is a schematic representation of a knowledge discovery system according to some embodiments of the invention.

FIG. 1 shows an embodiment of a Knowledge Discovery System 100. Discovery Server 102 may comprise a number of servers in communication with a number of data sources. For example, Discovery Server 102 may comprise knowledge map 104, people 106, and index data sources 108.

Additional data sources may be created and added to the above data sources 104, 106, 108, by searching though the data source examples shown on the left side of the FIG. 1. For example, data sources may include Web server 110 (which can access the Internet), directory/file server 112, other data store servers 114 (e.g., Lotus Domino servers), directory source server 116 (with access to a directory of people), and other data sources.

As data is added to the system, it can be managed by knowledge map editors 118 or searched by end users 120. As described herein, Knowledge Discovery System 100 components may communicate over network 122. Other configurations and components are also possible.

Discovery Server 102 is the back-end of the Knowledge Discovery System 100. Discovery Server 102 services (e.g., spiders, knowledge map building service, knowledge map Indexing service, and Metrics services) access, manage, and analyze the information from a variety of internal and external data sources and identify expertise areas of profiled users. Discovery Server's 102 user interface provides search and browse access to information from these sources.

Discovery Server 102 has automated tools to help with the creation of the knowledge map. Initially, a first draft of the knowledge map may be created by spidering a representative selection of documents or database; this is often referred to as "selecting the initial training set." Taxonomists (or editors) may then edit the initial knowledge map using a tool (e.g., the K-map Editor) to edit the machine-generated titles and document structure (clusters) to build a working taxonomy.

Another component of Discovery Server 102 is metrics. Metrics may comprise a set of computational tasks that collect usage information and calculate document and affinity to content (expertise) ratings. For example, a value for a document may be calculated based on the words contained in the document. That value may be combined with the value of document to others (e.g., number of times document is read, or the like) as tracked through metrics. Metrics may then be used to calculate an affinity between a person and documents (e.g., by monitoring user interactions to content). When an activity calculates a strong affiliation with a knowledge map category area, Discovery Server 102 may generates a message (e.g., an e-mail) to the profiled individual, suggesting this affinity to knowledge map content. Users then have the opportunity to approve or reject proposed affinities before they are published in the knowledge map. The published affinities help produce the expertise affinities that are published in a user's profile.

Upon initial set up for Discovery Server 102, data for user profiles may be initially extracted from an authoritative people source (e.g., directory source 116, a Domino Directory from a Domino server or an LDAP server), and then loaded into a separate profile database (e.g., people data source 106 (people.nsf)) on Discovery Server 102. Users 120 may query this database directly to locate experts by skill, experience, project, education, and job type.

As documents are processed by Discovery Server 102, the metrics system collects usage information and calculates affinities between people and the documents they used and authored. The metrics system continues to automatically monitor these interactions and maintain affinities to category areas as new documents are processed and affinities are approved for publishing in a user's profile. This has the benefit of automatically tracking areas of expertise as they change—perhaps declining in one area and strengthening in others. The metrics service also keeps track of what users do (read, doclink, forward, etc.) with the documents.

It is of note that affinities are proposed based on relationships between people and categories in a knowledge map/taxonomy, and not just on a set of keywords.

Discovery Server 102 may extract the raw usage data, or metrics, from spidered data sources (e.g., 110, 112, 114, 116) to create document values and to create affinities. Discovery Server 102 continues to track user 120 activity on documents categorized in knowledge map 104. Document values represent the calculated sum of all user 120 activity on the document (such as citations, forwarding, response documents, reading, etc.) and indicate a document's general value to the organization. In knowledge map interface, documents may be listed by this value metric.

Affinities may be calculated by Discovery Server 102 metrics processes, which collect and calculate data about user 120 interactions to all documents clustered within a knowledge map category. For example, if a user 120 has authored, read, edited, responded to, or created links to a number of documents in a category, then the metrics component calculates and proposes an affinity to the user.

Administrators can set a system-wide threshold (for example, calculate a 60% strength of affinity to a knowledge map category before proposing it to the profiled user) which controls the strength of the affinity based on a user's level of interaction in a category relative to all other users being tracked. One feature of Discovery Server 102 is that affinities are dynamic; they decay with time and inactivity.

In some embodiments, users 120 have control over publishing of affinities. The design of system 100 emphasizes the control of the end user 120 in making any information available to others in their profile. For example, when the individual's interaction with documents in knowledge map categories reaches a designated threshold, Discovery Server 102 may send an appropriate notification (e.g., an e-mail notification) to end user 120 with that proposed affinity information. The notification notifies end user 120 of the affinity determined (proposed) by Discovery Server 120 and requests confirmation and approval or disapproval to publish the identified affinity. If approved, the affinity appears in the user's profile document, accessible to others through knowledge map search. In that way, the end user has control over what information indicating their expertise is published to their profile and made available to others searching for subject expertise.

The foregoing describes some embodiments and environments for the present invention. The following is a more detailed explanation of metrics according to some embodiments of the invention.

Figure 2:
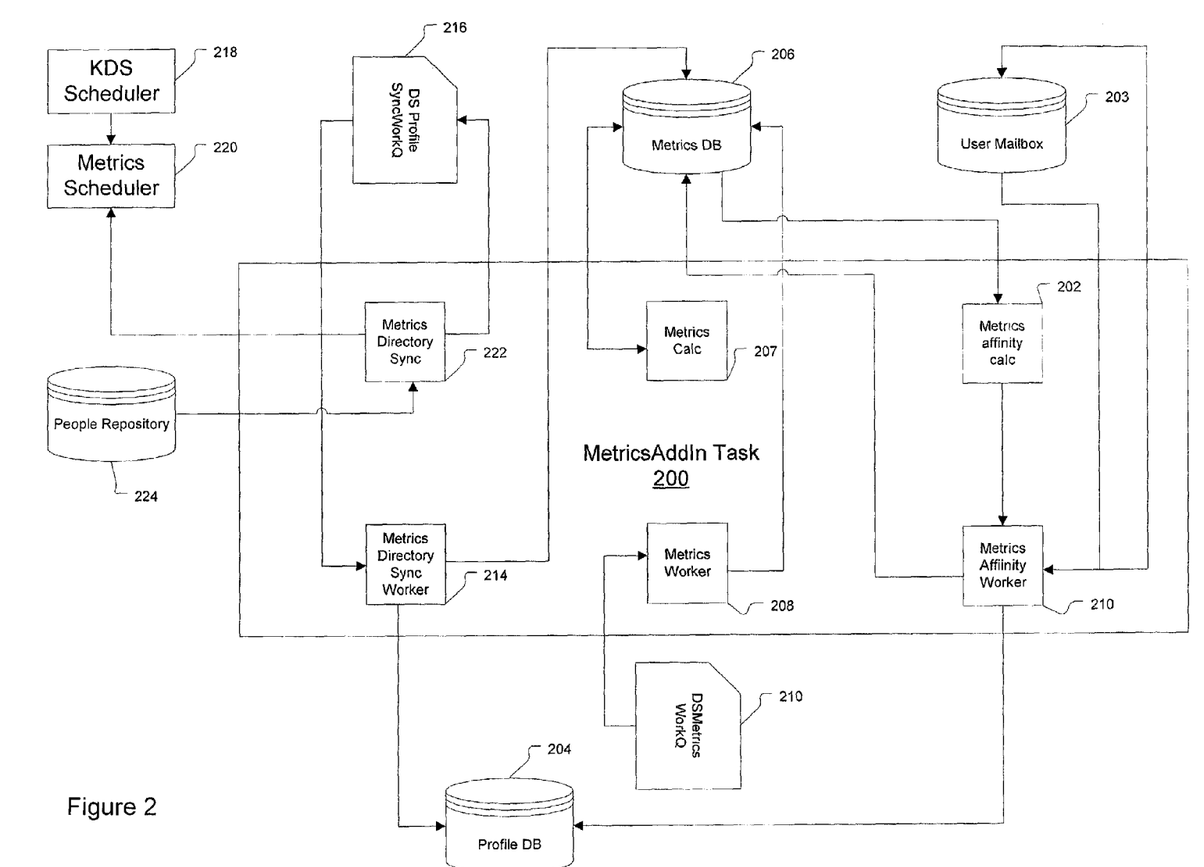
FIG. 2 is a schematic diagram of a metrics system according to some embodiments of the invention.

The Metrics task is a complex, multithreaded server task, running various components as "threads." FIG. 2 is a schematic of some components of the metrics task. FIG. 2 shows metrics components and their interaction with queues, spiders, and schedulers; it also shows the DirectorySync spider (named Metrics Directory Sync 222 in FIG. 2) and its interaction with the metrics.

As shown in FIG. 2, the Metrics add-in task 200 may comprise various workers and at least one spider. To make this architecture more understandable, Metrics may be logically divided in two parts: Metrics Processing and Metrics Collection. Metrics Processing consists of the two following tasks: AffinityWorkerTask and AffinityCalcTask.

The AffinityCalc task, which is a thread in the MetricsAddIn task 200, calculates the affinity (a value describing a person's interest in a certain topic or knowledge map category) a person has to a certain topic. The calculation of affinities is an ongoing process, always calculating the new affinity value based on the affinity value this individual person had on this particular topic before. This affinity value gets passed on to the MetricsAffinityCalc task 202, which (if set to do so in the Discover Server 102 Administration interface) initiates the mail workflow (e.g., via user mailbox database 203) with the user (to let the user accept or decline the proposed affinity). If the affinity proposal is accepted by the user, the affinity value gets published to the people profile database 204 (e.g., people.nsf) and stored in the corresponding tables of the metrics database 206 (e.g., DB2 tables).

MetricsCollection is actually a name for the Metrics-Worker 208 (a thread of the MetricsAddIn task) that accesses the MetricsWorkQ 210 to read a stream of XML documents from it and mine each of these XML documents for certain raw metrics data. When the XML of each document has been mined, the metrics data may be written and updated in the metrics database 206 (e.g., tables in DB2). The raw XML documents in the stream extracted may contain entities for each of the fields, defined in the mapping documents for spidered repositories (e.g. $Global map).

Document scoring is an approach to evaluate the content of a document in the knowledge map and may be enabled by metrics calculator 207. This value may be controlled by the following "triggers," which may be re-sorted by means of their weight on the computed document value: 1. Links to a document, 2. Links from a document, 3. Responses to a document, 4. number of times a document has been opened using the knowledge map, 5. time/date of the last update to a document.

The top-most trigger in this sorted list may represents the value with the highest weight on the calculation of the document value. For example, the higher this number "value" is, the more useful the associated document is meant to be for the users. In some embodiments, it is possible to change the order of these triggers in the metrics settings.

A "document fit value" (which may be viewed using a knowledge map editor tool) is a computed number representing the fit of a particular document into a certain category obtained though the knowledge map building clustering process. This value refers to a similar attribute computed for the knowledge map, informing whether a document fits into a certain category perfectly, or doesn't fit completely in a category but—in terms of content relation—fits this particular category rather than another. This value could also be referred to as a "vector distance", a vector in the k-mapdocument space (representing a document) from the very center of a K-mapcluster, which is, in fact, a category in the knowledge map.

In some embodiments a Profile Synchronizer may be implemented to track changes to the organizational and contact information for a certain person. Data in the Metrics database 206 may be processed by the Metrics Affinity Calc Task 202, calculating the affinity values between people and categories. Discovered affinities may then be proposed to the Metrics Affinity Worker 212, which sends out a message (e.g., an e-mail) with the proposal to the corresponding users. If a user accepts an affinity proposal, that affinity is published by the Metrics Affinity Worker 212 to the profile database 204.

The second part, updates or creation of people profile documents, is done by the Metrics Directory Sync Worker Task 214, reading update requests from the DS Profile Sync Work Queue 216 and publishing or updating people documents in the profile database 204.

Other system components may comprise a knowledge discovery system scheduler 218 and a metrics scheduler 220 that communicate with metrics directory sync 222. Metrics directory sync 222 may also communicate with people repository 224. Other components are also possible.

Some embodiments of the invention enable users or administrators to perform many actions with metrics. For example, the following is a listing a exemplary actions that may be performed. An administrator may enable or disable the Metrics Collection and Metrics Processing services (e.g., using Discovery Server 102 interface form).

It is also possible to change the threshold that the Discovery Server 102 uses to generate affinities (e.g., on an Affinity Settings form). For example, if a weak relationship between people and the categories for which they reportedly have affinities occurs repeatedly, it is possible to change the affinity threshold value (e.g., from 60% to 75%). It is also possible to tune the Metrics system by adjusting the order of the constants it uses to calculate document and affinity values on the Metrics Settings form.

It is possible to create Metrics reports using the Metrics Report form. A standard report may be created or predefined reports may be selected. For example, a predefined report, such as Top Documents by Value may be selected.

In addition, a custom report can be created that specifies the data (documents, people, or categories), individual metrics, and organization for the report. For example, a documents report could be created to include the hundred documents that have been linked to most often. In this case, you could display the author and the number of times linked for each document, and sort the report by the number of times linked in descending order. Other reports are also possible.

It is also possible to view Metrics report results using the Metrics Report Results form. In addition, editing of metrics (e.g., delete, back up, and restore metrics) may be accomplished using a Discovery Server form. It is also possible to view the Metrics Processing Log to check the service's performance.

The following is a discussion of the metrics setting form according to some embodiments of the invention. The metrics setting form may display constants that correspond to basic user actions and document attributes. The Metrics system may use these constants when it calculates affinity values for people and document values, respectively.

The constants may appear in the order in which Metrics assigns weight to them for a particular organization. For example, Metrics may assign greater weight to authoring documents than to editing documents by default. Other arrangements are possible.

The metrics setting form may comprise any suitable form. An example of the form according to some embodiments of the invention is discussed below. In this example, the metrics setting form may be used to change the order of the action and/or document constants and assign more or less weight to a user action or document attribute. For example, if editing documents is a better indicator of knowledge in a particular organization than authoring documents, it is possible to move the editing constant above the authoring constant in the Action Constants list so that Metrics assigns more weight to editing.

In each list of constants, Metrics assigns the first constant a value (e.g., a value of 1) and reduces the value of each successive constant by a predetermined amount (e.g., 30%). For example, when the Action constants are in their default order, Metrics assigns the first constant ("Authoring") a value of 1, the second constant ("Editing") a value of 0.7, the third constant ("Linking to") a value of 0.49, and so on. If the order of a list is changed, each constant assumes the value associated with its new place in the list. For example, if you move the "Editing" constant ahead of "Authoring" in the Action Constants list, "Editing" assumes a value of 1 and "Authoring" assumes a value of 0.7.

Metrics applies the values of these constants to the raw metrics it collects to calculate affinity and document values. For example, the following table (Table I) shows how a sample document's value is calculated (assuming the Document constants are in the default order indicated in the preceding section).

TABLE I

| Raw Metrics for a sample document | Constant Values | Calculated Values |
|---|---|---|
| Number of links to the document = 10 | "Links to" constant = 1 | 10 × 1 = 10 |
| Number of links from the document = 5 | "Links from" constant = 0.7 | 5 × 0.7 = 3.5 |
| Number of responses to the document = 3 | "Responses" constant = 0.49 | 3 × 0.49 = 1.47 |
| Number of times the document has been opened with K-map = 23 | "Times opened" constant = 0.34 | 2 × 0.34 = 0.68 |
| Number of times the document has been edited = 4 | "Recency" constant = 0.24 | 4 × 0.24 = 0.96 |

Metrics then adds the individual calculated values together to produce a document's total value; in the sample document's case, the total value is 16.61. However, if you switched the "Links to" constant to the third position and the "Responses" constant to the first position in the Documents Constants list, the sample document would have a value of 11.14 (a reduction in value of about 33%). This example suggests the effect the order of the constants can have on Metrics calculations.

Any of the above constant or calculated values may be manipulated as necessary. For example, metrics reduces the number of times a document has been opened with K-map by the number of responses to the document so that implied actions are not counted twice. (Metrics assumes that the author of a response has opened the original document at least once.) In the preceding example, Metrics reduced 23 (the "Times opened" raw metric) by 3 (the "Responses" raw metric) to produce a new metric value of 20. Metrics divides the number of times a document has been opened by 10 before it applies the "Reading" constant in the Action Constants list or the "Times opened" constant in the Document Constants list. Metrics does this to prevent frequently-opened documents and people who open a large volume of documents from having disproportionately-high document values and affinity values, respectively. In the preceding example, Metrics divided 20 (the "Times opened" raw metric—see TABLE I) by 10 to produce a new metric value of 2, which is the value to which Metrics applied the "Times opened" constant. Other manipulations are also possible.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A knowledge discovery system for determining relationships between documents, people, and categories of information within an organization, the system comprising:
   a data repository that stores a plurality of documents;
   a discovery server that determines metric values representing relationships between the documents stored in the data repository, a plurality of categories, and a plurality of people that interact with the documents, the discovery server comprising:
      a usage data collector that collects document usage data regarding interactions of the people with the documents;
      a document valuation metrics service that calculates a document value for each of the documents, wherein the document value of a given document reflects a value of content contained in the document to the plurality of people collectively, the document values being calculated based on the document usage data;
      a metrics calculator that calculates fit values for the documents in the plurality of documents with respect to the categories, wherein the fit value for a given document with respect to a given category reflects a strength of correspondence between content contained in the given document and the given category;
      an affinity calculator that calculates affinity values for the people with respect to the categories, wherein the affinity value of a given person with respect to a given category reflects a strength of a relationship of the given person to the given category, the affinity values being calculated based on (i) the document values, (ii) the fit values, and (iii) the document usage data; and
      a people profile database that contains user profiles corresponding to the plurality of people, wherein the people profile database receives affinity values from the affinity calculator and stores the affinity values for a give person from the plurality of people in a user profile that corresponds to the given person.

2. The system of claim 1, wherein the document usage data includes counts of the number of times different types of interactions are performed on the documents by the people, wherein the counts correspond to the different types of interactions.

3. The system of claim 2, wherein the different types of interactions of the people with the documents comprise one or more of linking documents, responding to documents, opening documents, or editing documents.

4. A computer implemented method for calculating a document value for a document that represents a value of the document to one or more users, the method comprising:
   determining a plurality of raw metric values for a document, wherein each of the raw metric values corresponds to a different type of interaction between one or more users and the document;
   qualitatively ranking the different types of interactions between the one or more users and the document according to a predetermined scheme;
   determining a constant value for each of the different types of interactions between the one or more users and the document based, at least in part, upon the ranking of the different types of interactions between the one or more users and the document;

calculating separate refined metric values for the different types of interactions between the one or more users and the document, wherein the refined metric value for a given type of interaction between the one or more users and the document is proportional to a product of the raw metric value that corresponds to the given different types of interactions between the one or more users and the document and the constant value that corresponds to the given different types of interactions between the one or more users and the document; and aggregating the refined metric values calculated for the different types of interactions between the one or more users and the document to calculate a document value of the document.

5. The method of claim 4, wherein the raw metric values are counts of the number of times the different types of interactions are preformed on the document by the one or more users, wherein the counts correspond to the types of interactions.

6. The method of claim 4, further comprising determining the predetermined scheme for ranking the different types of interactions between the one or more users and the document.

7. The method of claim 6, wherein the step of determining the predetermined scheme comprises enabling a user to set the predetermined scheme.

8. The method of claim 6, wherein the step of determining the predetermined scheme comprises automatically determining the predetermined scheme.

9. The method of claim 4, wherein the types of interactions between the one or more users and the document include one or more of following a link provided within the resource to another resource, following a link provided in another resource to the resource, responding to the resource, opening the resource, or editing the resource.

10. A processor readable medium, having processor readable code embodied thereon, that enables a processor to calculate a document value for a document that represents a value of the document to one or more users, the processor readable medium comprising:

processor readable code for determining a plurality of raw metric values for a document, wherein each of the raw metric values corresponds to a different type of interaction between one or more users and the document;

processor readable code for qualitatively ranking the different types of interactions between the one or more users and the document according to a predetermined scheme;

processor readable code for determining a constant value for each of the different types of interactions between the one or more users and the document based, at least in part, upon the ranking of the different types of interactions between the one or more users and the document; and processor readable code for calculating separate refined metric values for the different types of interactions between the one or more users and the document, wherein the refined metric value for a given type of interaction between the one or more users and the document is proportional to a product of the raw metric value that corresponds to the given different types of interactions between the one or more users and the document and the constant value that corresponds to the given different types of interactions between the one or more users and the document; and processor readable code for aggregating the refined metric values calculated for the different types of interactions between the one or more users and the document to calculate a document value of the document.

11. The processor readable medium of claim 10, wherein the document usage data includes counts of the number of times different types of interactions of the people with the documents are performed.

12. The processor readable medium of claim 10, further comprising processor readable code for determining the predetermined scheme for ranking the different types of interactions between the one or more users and the document.

13. The processor readable medium of claim 12, wherein the step of determining the predetermined scheme comprises enabling a user to set the predetermined scheme.

14. The processor readable medium of claim 12, wherein the step of determining the predetermined scheme comprises automatically determining the predetermined scheme.

15. The processor readable medium of claim 10, wherein the different types of interactions between the one or more users and the document include on or more of following a link provided within the resource to another resource, following a link provided in another resource to the resource, responding to the resource, opening the resource, or editing the resource.

16. A metrics system for calculating affinities between a user of a knowledge discovery system and categories in the knowledge discovery system, wherein the knowledge discovery system includes at least one data repository that stores a plurality of documents, the metrics system comprising:

a metrics calculator that calculates metric values that represent the relationships between the documents stored in the knowledge discovery system and the categories in the knowledge discovery system;

an affinity calculator that calculates affinity values that represent the relationships between the user and at least some of the categories in the knowledge discovery system, the affinity values being calculated based on the metric values and at least one interaction of the user with the documents;

a metrics data store that stores the calculated affinity values;

a metrics affinity module that sends at least one message to a user mailbox associated with the user according to a predetermined setting, the at least one message regarding the calculated affinity values.

17. The metrics system of claim 16, wherein the at least one interaction of the user with the documents comprises one or more of an authoring of a document, a viewing of a document, an editing of a document, a response to a document, or a creation of a link to a document.

18. The metrics system of claim 16, wherein the at least one message sent to the user mailbox enables the user to make the affinity values public or keep the affinity values private.

19. The metrics system of claim 16, wherein the predetermined setting comprises a threshold, and wherein sending at least one message to the user mailbox according to the predetermined setting comprises sending a message to the user mailbox to report at least one calculated affinity value that exceeds the threshold.

20. The metrics system of claim 19, wherein a system administrator is enabled to set the threshold.

21. A method for calculating affinities between a user of a knowledge discovery system and categories in the knowledge discovery system, wherein the knowledge discovery system includes at least one data repository that stores a plurality of documents, the method comprising:

- calculating metric values that represent the relationships between the documents stored in the knowledge discovery system and the categories in the knowledge discovery system;
- calculating affinity values using an affinity calculator, the affinity values representing the relationships between the user and at least some of the categories in the knowledge discovery system, the affinity values being calculated based on the metric values and at least one interaction of the user with the documents;
- storing the calculated affinity values in a metrics data store;
- sending at least one message to a user mailbox associated with the user according to a predetermined setting, the at least one message regarding the calculated affinity values.

22. The method of claim 21, wherein the at least one interaction of the user with the documents comprises one or more of an authoring of a document, a viewing of a document, an editing of a document, a response to a document, or a creation of a link to a document.

23. The method of claim 21, wherein the at least one message sent to the user mailbox enables the user to make the affinity values public or keep the affinity values private.

24. The method of claim 21, wherein the predetermined setting comprises a threshold, and wherein sending at least one message to the user mailbox according to the predetermined setting comprises sending a message to the user mailbox to report at least one calculated affinity value that exceeds the threshold.

25. The method of claim 24, wherein a system administrator is enabled to set the threshold.

* * * * *